United States Patent

Diamond et al.

[11] Patent Number: 5,112,671
[45] Date of Patent: May 12, 1992

[54] TILE PRODUCT HAVING MULTIPLE LEVELS OF HEIGHT, MULTIPLE LEVELS OF GLOSS AND MORTAR-LINE SURROUND

[75] Inventors: Ivan Diamond, Edgware; James J. Lawson, Fenham, both of England; Walter J. Lewicki, Jr., Lancaster, Pa.; Stavros C. Stavrinou, Nicosia, Cyprus

[73] Assignee: Armstrong World Industries, Inc., Lancaster, Pa.

[21] Appl. No.: 532,915

[22] Filed: Jun. 4, 1990

Related U.S. Application Data

[63] Continuation-in-part of Ser. No. 337,470, Apr. 13, 1989, abandoned.

[51] Int. Cl.⁵ .............................................. B32B 3/02
[52] U.S. Cl. .................................... 428/156; 428/172; 428/203; 428/44; 428/46; 428/157; 428/159; 428/167; 428/195; 428/213; 428/215; 428/212; 428/522; 428/913.3; 428/207; 428/204; 428/192; 428/908.8
[58] Field of Search ............... 428/156, 172, 203, 44, 428/46, 157, 139, 167, 195, 213, 215, 212, 522, 913.3, 207, 204, 192, 908.8

[56] References Cited

U.S. PATENT DOCUMENTS

| | | | |
|---|---|---|---|
| 1,825,877 | 10/1931 | Loetscher | 52/408 |
| 3,953,639 | 4/1976 | Lewicki, Jr. | 428/159 X |
| 3,958,054 | 5/1976 | McKee, Jr. et al. | 428/172 |
| 4,131,663 | 12/1978 | Lewicki, Jr. | 428/177 X |
| 4,172,169 | 10/1979 | Mawson et al. | 478/161 X |
| 4,187,131 | 2/1980 | Shortway et al. | 428/203 X |
| 4,597,245 | 10/1985 | Colyer | 428/156 X |
| 4,614,680 | 9/1986 | Fry et al. | 478/158 |

FOREIGN PATENT DOCUMENTS

1366494 9/1974 United Kingdom.
2132555 7/1984 United Kingdom.

*Primary Examiner*—Ellis P. Robinson
*Assistant Examiner*—William P. Watkins, III

[57] ABSTRACT

A tile product having a substantially non-porous vinyl composition base and a multilevel embossing and gloss which has a mechanically embossed mortar-line surround and which is free of gloss defects formed by pockets of air trapped between the wear layer and embossing mold during embossing is produced by applying a vacuum to the press during embossing. Preferably, the tile is laminated in a hot press heated by RF energy and cooled in a cold press to reduce the temperature of the wear layer to below its glass transition temperature.

16 Claims, 1 Drawing Sheet

TILE PRODUCT HAVING MULTIPLE LEVELS OF HEIGHT, MULTIPLE LEVELS OF GLOSS AND MORTAR-LINE SURROUND

This application is a continuation-in-part of commonly owned copending application Ser. No. 337,470 filed Apr. 13, 1989, now abandoned.

FIELD OF THE INVENTION

The present invention is directed to a tile product, including wall tile and floor tile, and a process for making the tile product. In particular, the invention is directed to a gloss defect-free embossed tile having a substantially non-porous base. The tile has multiple levels of height, multiple levels of gloss and a mechanically embossed mortar-line surround.

BACKGROUND OF THE INVENTION

Hot press/cold press operations are well known in the tile making art. See, for example, Loetscher U.S. Pat. No. 1,825,877 wherein a coating layer is embossed and fused to the remainder of the tile structure in a press having platens to which steam is applied. Before the pressure is relieved, the steam shut off and water circulated through the platens to reduce the temperature of the tile product.

Also note British Patent Specification No. 1,366,494 of Severus et al. which is directed to a method of making multi-layer laminates using two presses, one heated to laminate the product and the second cooled to reduce the temperature of the laminated product while under pressure of the second press. At lines 28 to 34 on page 1, Severus et al. discuss expelling the air between the individual layers of the material by repeated closing and opening of the press.

Becker et al. U.S. Pat. No. 4,747,901 also discloses a hot press/cold press laminating and embossing process for the production of floor and wall tile. They also disclose the use of porous layers to allow the passage of air through the thickness of the tile material.

The use of high frequency electrical energy and pressure to form a floor or wall tile is disclosed in Creighton et al. U.S. Pat. No. 4,604,312. They too use a porous, thermoplastic base material and a perforated film.

As identified by the above patent references, the problem of air entrapment between the upper exposed surface of the tile and the embossing plate has been appreciated by those skilled in the art. The entrapped air prevents 100% intimate contact of the tile wear layer with the embossing plate and causes unintended areas of high gloss on the exposed surface of the finished tile product. These areas of high gloss are typically ¼ of an inch to 1½ inches in dimension.

This problem has been significantly reduced by the use of porous starting materials. However, the prior art has been unable to produce gloss defect-free tile having a substantially non-porous base layer. Particularly, if the tile has a mortar-line surround design. Many tile designs include a mortar-line surround pattern which is an embossed depression surrounding the periphery of the tile and resembles a mortar or grout line between two ceramic tile. The mortar-line surround helps to hide the tile seams.

It is an object of the invention to provide a method of producing gloss defect-free tile having a substantially non-porous base, even if the tile has a mortar-line surround pattern.

A further object is to provide a process to produce a tile having intricate and detailed embossed patterns which are in precise registration with a printed image and includes multiple levels of gloss and a mortar-line surround pattern. Such a tile product can only be formed if there is 100% intimate contact between the wear layer and embossing mold. As discussed previously, entrapped air forms unintended areas of high gloss which destroy the intended embossing pattern. Entrapped air is a particularly pronounced problem if the tile has a mechanically embossed mortar-line surround pattern.

Another object is to provide a process which enables the use of inexpensive embossing plates or molds which will be able to produce the intricate and detailed embossing patterns.

Yet another object is to provide a process which produces a curl free tile having different binder levels in the base and wear layer.

Other objects and advantages of the invention will become apparent upon reading the following detail description.

SUMMARY OF THE INVENTION

Figure 1:
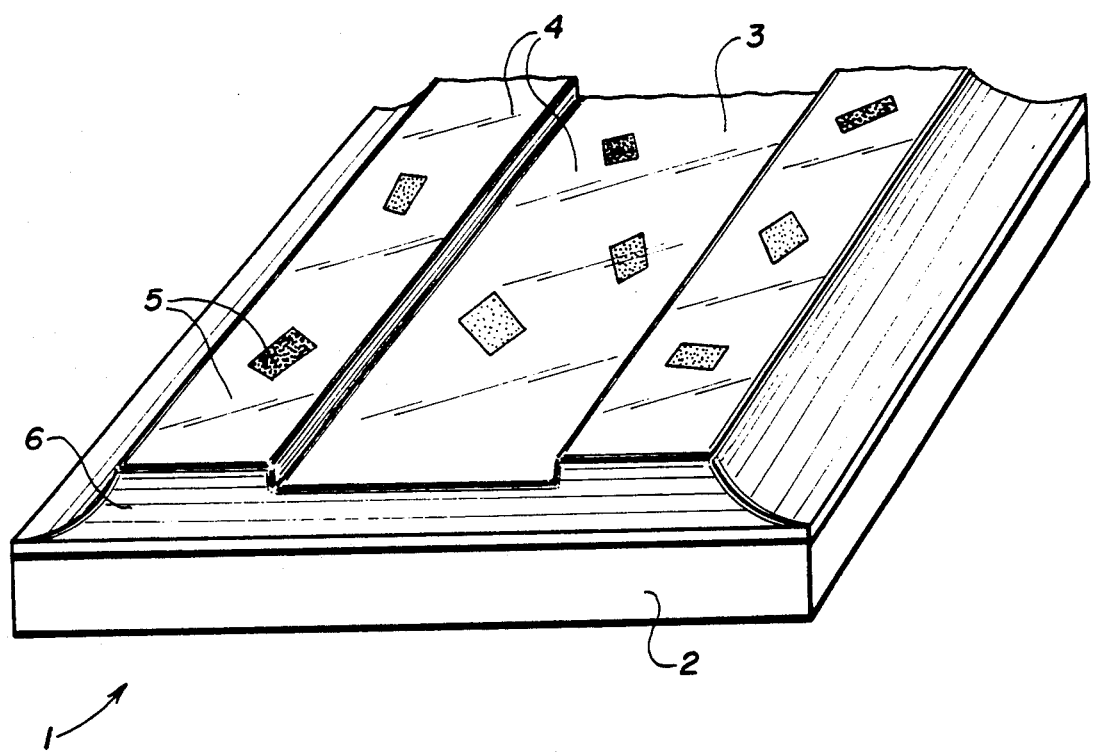
FIG. 1 is a perspective view of a tile of the present invention.

In accordance with the invention, a vacuum is applied to the tile base and wear layer during the embossing and laminating process to remove any air which may become entrapped between the wear layer and embossing plate when the periphery of the tile is contacted with the portion of the embossing plate which forms a mortar-line surround pattern. The vacuum should be at least 28 inches of mercury and preferably between 28 and 29 inches of mercury. The vacuum may be applied in a stepwise or sequential manner with application of pressure to the tile base and wear layer. Further, the vacuum may be broken simultaneously with the initiation of heating by the preferred RF (radio frequency) energy.

The vacuum is most efficient when air is drawn from between the wear layer and embossing mold first and then is drawn between the wear layer and tile base. If the vacuum is sufficiently high before the mortar-line surround contacts and compresses the wear layer, it is not necessary to include bleed ports in the embossing plate to allow air to escape from between the embossing plates.

A silicone rubber mold has been used as the embossing tool or plate. Such embossing tools are relatively inexpensive, are easy to form and have a capability of producing the desired detailed embossing pattern. Electroformed plates can also be used, as well as textured paper.

In a preferred tile, the wear layer is at least partially transparent or translucent and has a printed image applied to the surface of the wear layer adjacent to the tile base. By use of registration holes, precise registration of the printed image and embossing pattern can be obtained.

DETAILED DESCRIPTION

A vinyl composition tile having a substantially non-porous base has been produced using the present invention and is represented by FIG. 1. However, the scope of the invention is not limited to tiles of vinyl composition only. Both wear layer and tile base formulations using non-PVC compositions have been made.

The tile 1 has a substantially non-porous base 2 and a thermoplastic wear layer 3. The base may be similar to non-porous bases of the prior art, such as filled or unfilled PVC resin. The wear layer may also be made from thermoplastic compositions known in the prior art, such as PVC, or thermoset compositions, such as a partially cross-linkable polyester/polyurethane. The base and wear layer compositions per se are not unique. Preferably the wear layer is a rigid thermoplastic film having no more than about 1 to 3 parts by weight of plasticizer.

However, the combination of the non-porous base and thermoplastic wear layer with multiple levels of height 4 and multiple levels of gloss 5 without high gloss defects due to entrapped air bubbles is an embodiment the prior art has been unable to obtain. Particularly, in a tile having a mortar-line surround pattern 6.

Multiple levels of gloss have been obtained by the prior art using a flat bed press. Roll press operations have not yielded tile with multiple levels of gloss of greater than about 10 as measured on a Gardner gloss meter at 60°. The gloss level difference in the present invention is at least 20 as measured by a Gardner gloss meter at 60%, and preferably at least 40 as measured by a Gardner gloss meter at 60%. Further roll press operations are limited to about 3 mil thick wear layers. The thicker wear layers permitted by the flat bed press operation permit a tile pattern having greater detail. The wear layer of the present invention is preferably at least 10 mils thick, and more preferably at least 15 mils thick. This permits a mortar-line surround at least 6 mils in depth, and preferably at least 8 mils in depth.

However, tile made on a flat bed press with a mortar-line surround traps air between the embossing plate and wear layer which leads to high gloss defects. The trapped bubbles of air prevent 100% intimate contact between the wear layer and embossing plate. The prior art has tried to minimize this problem by using porous bases. The present inventors have overcome this problem by eliminating the trapped air.

An effective process has been developed using a four-position, horizontal, rotary turntable with an embossing tool or mold at each turntable position. The four positions are load, hot press, cold press and unload.

At the loading station, the operator takes a sheet of film which comprises the wear layer and places it face down on the embossing tool. The wear layer may have an image printed on the surface opposite the embossing tool. It has two registration holes which were punched in precise registration with printed image. The holes are placed over the registration pins in the mold frame to obtain precise registration between the embossing tool and printed image.

A tile base of substantially non-porous material is placed face down on the wear layer within a retaining frame. A cover plate is placed over the tile base. The cover plate is aluminum or copper since they are the most suitable metals for use with RF energy.

The turntable is then rotated 90° to deliver a tile base and wear layer into the hot press. The hot press is linked to a RF generator which transmits power to the platen of the press and creates a RF field within which heating and softening of the film and tile base take place. The tile base and wear layer is also located within a vacuum frame which, when the press closes, forms a seal to permit air to be evacuated. Vacuum is applied to the vacuum frame before the process develops full pressure. When the maximum vacuum is obtained, the vacuum is broken, the RF energy is initiated and maximum pressure is developed to impart final gloss, texture and adhesion between the tile base and wear layer.

After sufficient heating and pressure to laminate and emboss the tile, the press is opened and the turntable is rotated through another 90° to deliver the embossing tool, tile and cover plate to the cold press. In the cold press, the temperature of the tile is reduced to below the glass transition temperature of the wear layer. During the cooling process, pressure is applied by the bottom water-cooled platen.

The cooled tile is then delivered to the unload station by an additional 90° rotation of the turntable. At the unload station, the tile is removed from the registration pins and placed face down on a reheat conveyor which transports it to the punch press. Prior to punching, the tile is subjected to radiant heat on the uppermost surface (the back of the tile) to heat it to the required punching temperature. The tile is placed face down on registration pins in the die cavity and the finished tile is punched out.

Embossing tools made of silicone rubber and electro-formed nickel have been used. Excellent results have been obtained with R.T.V.664 silicone rubber manufactured by General Electric Co. Comparable results have been obtained using carbon-free electroformed plates of nickel and copper.

If the wear layer and tile base have different levels of binder concentration and the wear layer and tile base are cooled simultaneously, the tile tends to curl. This problem is overcome by cooling the layer with the greater binder concentration more quickly than the other layer.

EXAMPLE

A vinyl composition tile, 2.5 millimeters in thickness, was manufactured. The formulation of the tile base, which is representative of conventional non-porous tile bases, was as follows:

| | |
|---|---|
| Polyvinyl chloride | 6.1% |
| Polyvinyl chloride/polyvinyl acetate | 11.0% |
| D.I.O.P. plasticizer | 6.1% |
| Durostabe 2236 stabilizer | 0.44% |
| Titanium dioxide pigment | 2.46% |
| Fine limestone filler | 73.7% |

The tile base was fully consolidated and not porous.

The wear layer was a 100% polyvinyl chloride film which was unplasticized, extruded/calendered and UV stabilized by methods standard in the art. An image was printed on one side of the wear layer using standard plastisol inks.

The cycle time for the turntable was 16 seconds. The RF generator was an 80 KW output generator set at a frequency of 27.12 MHZ. The vacuum was drawn to 28 to 29 inches of mercury and 2,250 lbs. per sq. in. of pressure was applied during the hot press cycle.

The tile was heated to a temperature of 230° C. The minimum required temperature being 180° C. The pressure and temperature were applied for 8 seconds.

In the cold press, the top platen was maintained at a maximum temperature of 25° C. The tile was cooled to below 160° F. while a pressure similar to that of the hot press was applied.

The back surface of the tile was heated to a temperature of 140° F. before the tile was placed in the punch press. The tile was cut in the punch press to a finished size of 300 millimeters by 300 millimeters.

The resulting tile was free of high gloss defects which are created by air entrapment between the wear layer and embossing plate which occurs when a non-porous tile base is used. Further, there was 100% intimate contact between the surface of the wear layer and the embossing plate so that the intricate and detailed embossing pattern was clearly and accurately formed. If a stencil product is to be made using the process, a release paper may be placed between the wear layer and embossing plate to prevent chips from sticking to the embossing plate.

By use of the registration holes and pins, precise registration between the embossing pattern and printed image is obtained. This permits the production of realistic patterns such as wood grain.

Further, the intimate contact between the wear layer and embossing plate permits the production of tile having a surface with multiple layers of gloss and areas in which the gloss level is a continual gradation from a high gloss level to a matte finish, a feature which has not been produced by a roll press operation.

What is claimed is:

1. A tile comprising a substantially non-porous base and a wear layer, wherein said wear layer is a polymeric film laminated to said base, said film being embossed, said film being of substantially homogeneous composition, said film having an exposed surface opposite said base, said exposed surface having multiple levels of height and multiple levels of gloss, the tile having a mortar-line surround around the periphery of the tile, said mortar-line surround being a mechanically embossed depression around the periphery of the tile, the depression being at least 6 mils deep, wherein the mortar-line surround depression is in registration with a pattern printed on the tile, the gloss level difference being at least 20 as measured by a Gardner gloss meter at 60°.

2. The tile of claim 1 wherein the exposed surface includes an area with a continual gradation in gloss level.

3. The tile of claim 1 wherein the mortar-line surround depression is in registration with a mortar line printed on the tile.

4. The tile of claim 1 wherein the tile is printed and the embossing is in registration with the printed image.

5. The tile of claim 1 wherein the film is at least 10 mils thick.

6. The tile of claim 5 wherein the film is at least 15 mils thick.

7. The tile of claim 1 wherein the gloss level difference is at least 40 as measured by a Gardner gloss meter at 60°.

8. The tile of claim 1 wherein the depression is at least 8 mils deep.

9. The tile of claim 1 wherein the polymeric film is a thermoplastic film.

10. The tile of claim 1 wherein the polymeric film is a non-foamed polymeric layer.

11. The tile of claim 7 wherein the polymeric film is a non-foamed polymeric layer.

12. A tile consisting essentially of a substantially non-porous base and a polymeric wear layer laminated to said base, said layer being embossed, said layer being of substantially homogeneous composition, said layer having an exposed surface opposite said base, said exposed surface having multiple levels of height and multiple levels of gloss, the tile having a mortar-line surround around the periphery of the tile, said mortar-line surround being a mechanically embossed depression around the periphery of the tile, the depression being at least 6 mils deep, wherein the mortar-line surround depression is in registration with a pattern printed on the tile, the gloss level difference being at least 20 as measured by a Gardner gloss meter at 60°.

13. The tile of claim 12 wherein the polymeric layer is a non-foamed polymeric layer.

14. The tile of claim 12 wherein the gloss level difference is at least 40 as measured by a Gardner gloss meter at 60°.

15. The tile of claim 14 wherein the polymeric layer is a non-foamed polymeric layer.

16. The tile of claim 12 further consisting of a decorative ink pattern printed on the polymeric layer adjacent the base.

* * * * *